(12) United States Patent
Matsukawa et al.

(10) Patent No.: US 10,593,453 B2
(45) Date of Patent: Mar. 17, 2020

(54) HIGH PERMEABILITY MAGNETIC SHEET

(71) Applicant: TDK CORPORATION, Tokyo (JP)

(72) Inventors: Atsuhito Matsukawa, Tokyo (JP);
Yoshihiro Honjo, Tokyo (JP);
Mitsuhiro Matsuhashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 261 days.

(21) Appl. No.: 15/657,463

(22) Filed: Jul. 24, 2017

(65) Prior Publication Data

US 2018/0025821 A1 Jan. 25, 2018

(30) Foreign Application Priority Data

Jul. 25, 2016 (JP) .................. 2016-145593
Feb. 23, 2017 (JP) .................. 2017-032393

(51) Int. Cl.
| | |
|---|---|
| *H01F 1/147* | (2006.01) |
| *H01F 1/26* | (2006.01) |
| *B22F 1/00* | (2006.01) |
| *B22F 9/08* | (2006.01) |
| *B29C 71/00* | (2006.01) |
| *C22C 38/02* | (2006.01) |
| *C22C 38/06* | (2006.01) |
| *B29K 105/18* | (2006.01) |
| *B29K 505/12* | (2006.01) |
| *B29L 7/00* | (2006.01) |

(52) U.S. Cl.
CPC ............ *H01F 1/14775* (2013.01); *B22F 1/00* (2013.01); *B22F 1/0055* (2013.01); *B22F 9/082* (2013.01); *B29C 71/0072* (2013.01); *C22C 38/02* (2013.01); *C22C 38/06* (2013.01); *H01F 1/14791* (2013.01); *H01F 1/26* (2013.01); *B22F 2301/35* (2013.01); *B29K 2105/18* (2013.01); *B29K 2505/12* (2013.01); *B29L 2007/002* (2013.01); *C22C 2202/02* (2013.01)

(58) Field of Classification Search
None
See application file for complete search history.

(56) References Cited

U.S. PATENT DOCUMENTS 4,130,448 A * 12/1978 Inoue ............... C22C 38/06
148/101
5,207,841 A * 5/1993 Shigeta ............. C22C 38/34
148/307

(Continued)

FOREIGN PATENT DOCUMENTS

JP H10-79302 A 3/1998
JP H11-260618 A 9/1999
(Continued)

*Primary Examiner* — Kevin M Bernatz
(74) *Attorney, Agent, or Firm* — Oliff PLC

(57) ABSTRACT

A magnetic sheet comprises, by vol. %, Fe—Si—Al alloy flat powder: 36% or more. The Fe—Si—Al alloy flat powder comprises, by wt %, 9.3%≤Si≤9.7%, 5.7%≤Al≤6.1%, and remaining Fe. The Fe—Si—Al alloy flat powder has: an aspect ratio in a range of 20 or more and 50 or less; a 50% particle size $D_{50}$ in a range of 50 μm or more and 100 μm or less; and a coercivity Hc of 60 A/m or less. The magnetic sheet has a temperature characteristic of permeability μ' measured at 1 MHz exhibiting a maximum value in a range of 0° C. or more and 40° C. or less.

1 Claim, 12 Drawing Sheets

(56) References Cited

U.S. PATENT DOCUMENTS

| | | | | |
|---|---|---|---|---|
| 6,083,325 | A * | 7/2000 | Bitoh | H01F 1/15341 148/121 |
| 6,312,531 | B1 * | 11/2001 | Matsutani | H01F 1/14791 148/307 |
| 6,579,383 | B2 * | 6/2003 | Takemoto | H01F 1/14791 148/309 |
| 2005/0034787 | A1 * | 2/2005 | Song | B22F 9/007 148/104 |
| 2009/0267017 | A1 * | 10/2009 | Matsukawa | B22F 1/0055 252/62.55 |
| 2012/0274438 | A1 * | 11/2012 | Hachiya | H01F 17/0013 336/221 |
| 2016/0172086 | A1 * | 6/2016 | Habu | H01F 1/12 428/206 |
| 2016/0268026 | A1 * | 9/2016 | Matsutomi | H01F 1/26 |

FOREIGN PATENT DOCUMENTS

| | | |
|---|---|---|
| JP | 2009-266960 A | 11/2009 |
| JP | 2010-196123 A | 9/2010 |
| JP | 2011-108775 A | 6/2011 |

* cited by examiner

HIGH PERMEABILITY MAGNETIC SHEET

BACKGROUND OF THE INVENTION

1. Field of the Invention

The present invention relates to a high permeability magnetic sheet suitable as a magnetic sheet for pen tablets with an electromagnetic induction type digitizer that is one of input systems on a tablet terminal screen.

2. Description of the Related Art

For an input system of mobile terminals, such as smartphones and tablet PCs, touch panels where input is performed by touching a screen with a finger or so are commonly used due to their good intuitive usability. The mobile terminals have been equipped with an input system capable of character input, drawing, and the like, using a pen, and a representative example of the input system is electromagnetic induction type digitizers (pen tablets). The electromagnetic induction type digitizers are characterized in that a coil of an electronic pen and an antenna coil of a digitizer body are combined magnetically as a primary coil and a secondary coil of a transformer, but malfunction or defects occur if this combination receives a magnetic noise (this noise source includes an inverter circuit for backlight and a DC-DC converter of a power source circuit) from outside, and sensitivity of the pen input deteriorates. For this measure, when a magnetic sheet is arranged between the antenna coil and the noise source, there are advantages that the magnetic sheet functions as a path between the electronic pen and magnetic fluxes in addition to obtaining a sufficient magnetic shield effect.

To improve the sensitivity of pen input in the pen tablet terminals, the magnetic sheet needs to have a large product ($\mu' \times t$) of permeability $\mu'$ and thickness t. Meanwhile, a member thickness of the magnetic sheet or so also needs to be reduced as much as possible in response to request for smaller thickness and weight of the terminals, and the magnetic sheet is thus required to have a high permeability $\mu'$.

In the prior arts of increasing permeability $\mu'$ of magnetic sheets, it is known to add post steps, such as heat pressing, and increase a filling rate of magnetic materials, but this fails to avoid cost increase.

In a prior art of increasing permeability of flat soft magnetic materials, Patent Document 1 discloses a flat soft magnetic material including an aspect ratio of 20 or more and a 50% particle size $D_{50}$ of 50 μm or more, wherein $D_{50}$ (μm), coercivity Hc (A/m), and bulk density BD (Mg/m$^3$) satisfy a relation of $D_{50}$ (Hc×BD)≥1.5. Patent Document 2 discloses a composite magnetic body substantially composed of a soft magnetic alloy powder and a binder, wherein the soft magnetic powder has at least an oxidized surface and a flat shape, and discloses a technique for compensating a composition deviation due to the surface oxidation in advance by controlling Tc. Furthermore, Patent Document 3 discloses a technique for using a composition of a positive magnetostriction constant so that temperature coefficient of core loss becomes negative in a pressed powder core using an Fe—Al—Si alloy.

Patent Document 1: JP 2009-266960A
Patent Document 2: JP H10-79302A
Patent Document 3: JP H11-260618A

SUMMARY OF THE INVENTION

In accordance with Patent Document 1, a magnetic sheet whose permeability $\mu'$ is 200 is obtained, but Patent Document 1 is not enough to obtain a permeability $\mu'$ of 220 or more, which is required for the magnetic sheets for pen tablets. In the composition control based on Tc of the flat powder described in Patent Document 2, a ratio of Fe composition can be estimated, but each composition of Si and Al is hard to be estimated. Furthermore, the composition range of the Fe—Al—Si alloy described in Patent Document 3 is for improvement in temperature characteristic of a pressed core, and is thus too large as the magnetic sheet using a flat powder.

Accordingly, as a technique for increasing permeability of the flat soft magnetic material, the present invention focuses on temperature characteristic of $\mu'$ of the magnetic sheet, and aims to inexpensively provide a magnetic sheet having a sufficiently high permeability $\mu'$ as a magnetic sheet for pen tablets.

The magnetic sheet of the present invention is a magnetic sheet comprising, by vol. %, Fe—Si—Al alloy flat powder: 36% or more, the Fe—Si—Al alloy flat powder (1) comprising, by wt %, 9.3%≤Si≤9.7%, 5.7%≤Al≤6.1%, and remaining Fe, and (ii) having:

an aspect ratio in a range of 20 or more and 50 or less;
a 50% particle size $D_{50}$ in a range of 50 μm or more and 1 or less; and
a coercivity Hc of 60 A/m or less, wherein the magnetic sheet has a temperature characteristic of permeability $\mu'$ measured at 1 MHz exhibiting a maximum value in a range of 0° C. or more and 40° C. or less thereinafter, $\mu'$ is a value measured at 1 MHz).

When the above features are satisfied, a magnet sheet for pen tablets having a sufficiently high permeability can be prepared without any post steps such as heat pressing.

The magnetic sheet of the present invention may satisfy 9.40≤Si≤9.65.

Advantageous Effects of Invention

The present invention can obtain a high permeability magnetic sheet without any post steps such as heat pressing, and can thus inexpensively provide a high permeability magnetic sheet used for pen tablets.

DESCRIPTION OF THE PREFERRED EMBODIMENTS

<Flat Soft Magnetic Material>

A flat soft magnetic material (hereinafter, may be referred to as "flat powder") includes: compositions of $9.3 \leq Si \leq 9.7$, $5.7 \leq Al \leq 6.1$, and remaining Fe by wt %; an aspect ratio of 20 or more and 50 or less; a 50% particle size $D_{50}$ of 50 μm or more and 100 μM or less; and a coercivity Hc of 60 A/m or less.

A center composition of a sendust is Si=9.6 wt %, Al=5.4 wt %, and remaining Fe, and it is considered that magnetocrystalline anisotropy constant $K_1=0$ and saturation magnetostriction constant $\lambda_s=0$ are achieved at the same time at room temperature around this composition, and that a high permeability is obtained.

When an Fe—Si—Al alloy is flattened, however, the surface of the Fe—Si—Al alloy is oxidized due to increase in specific surface area. When a heat treatment is carried out for removal of strain caused by the flattening, thermodynamically stable oxides of Si and Al are generated preferentially, and a composition segregation occurs. As a result, it is conceivable that the alloy composition of the flat powder is changed.

As a result of detailed experiments, the present inventors have found out that the raw material compositions should be set to $9.3 \leq Si \leq 9.7$, $5.7 \leq Al \leq 6.1$, and remaining Fe. The present inventors have further found out that when the raw material compositions are set to $9.40 \leq Si \leq 9.65$, $5.7 \leq Al \leq 6.1$, and remaining Fe, the alloy composition of the flat powder is optimized. In particular, the present inventors have found out that when $9.40 \leq Si \leq 9.65$ is satisfied, permeability μ' measured at 1 MHz has a favorable temperature characteristic.

The flat powder is configured to have its shape and property so that an aspect ratio is 20 or more and 50 or less, a 50% particle size $D_{50}$ is 50 μm or more and 100 μm or less, and a coercivity Hc is 60 A/m or less are obtained.

When the flat powder has a small aspect ratio, a demagnetizing field becomes large, and a magnetic sheet thus has a small permeability μ'. When the flat powder has a large aspect ratio, a demagnetizing field becomes small, but the flat powder has a small bulk density, and the magnetic sheet of this flat powder is thus hard to have a large filling rate. From this balance, the present inventors consider that an aspect ratio where the magnetic sheet has a largest permeability is 20 to 50.

The larger $D_{50}$ of the flat powder is, the smaller coercivity Hc is, and the magnetic sheet thus has a large μ'. When the flat powder has a $D_{50}$ of more than 100 μm, however, a surface roughness of a magnetic sheet whose thickness is 50 μm or so cannot be ignored anymore, a filling rate lowers due to increase in its apparent thickness, and the magnetic sheet has a small permeability. The present inventors consider that the flat powder has an optimal $D_{50}$ of 50 μm or more and 100 μm or less.

Figure 1:
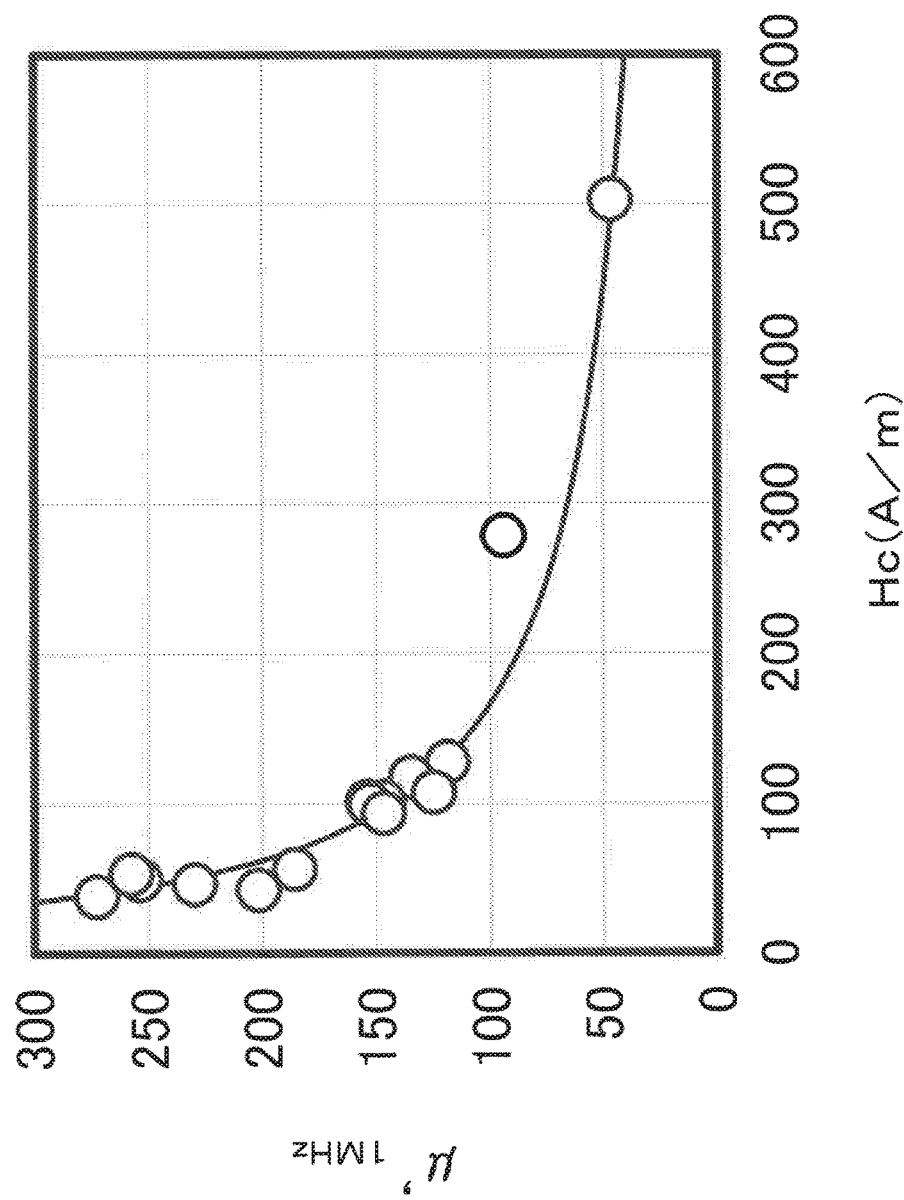
FIG. 1 is a graph showing a relation between Hc of a flat powder and $\mu'$ (23° C.) of a magnetic sheet.

FIG. 1 shows a relation between coercivity Hc of a flat powder and μ' of a magnetic sheet. The coercivity Hc is preferably smaller, but a magnetic sheet whose μ' is about 220 is enough to have a coercivity lie of 60 A/m or less.

Figure 2:
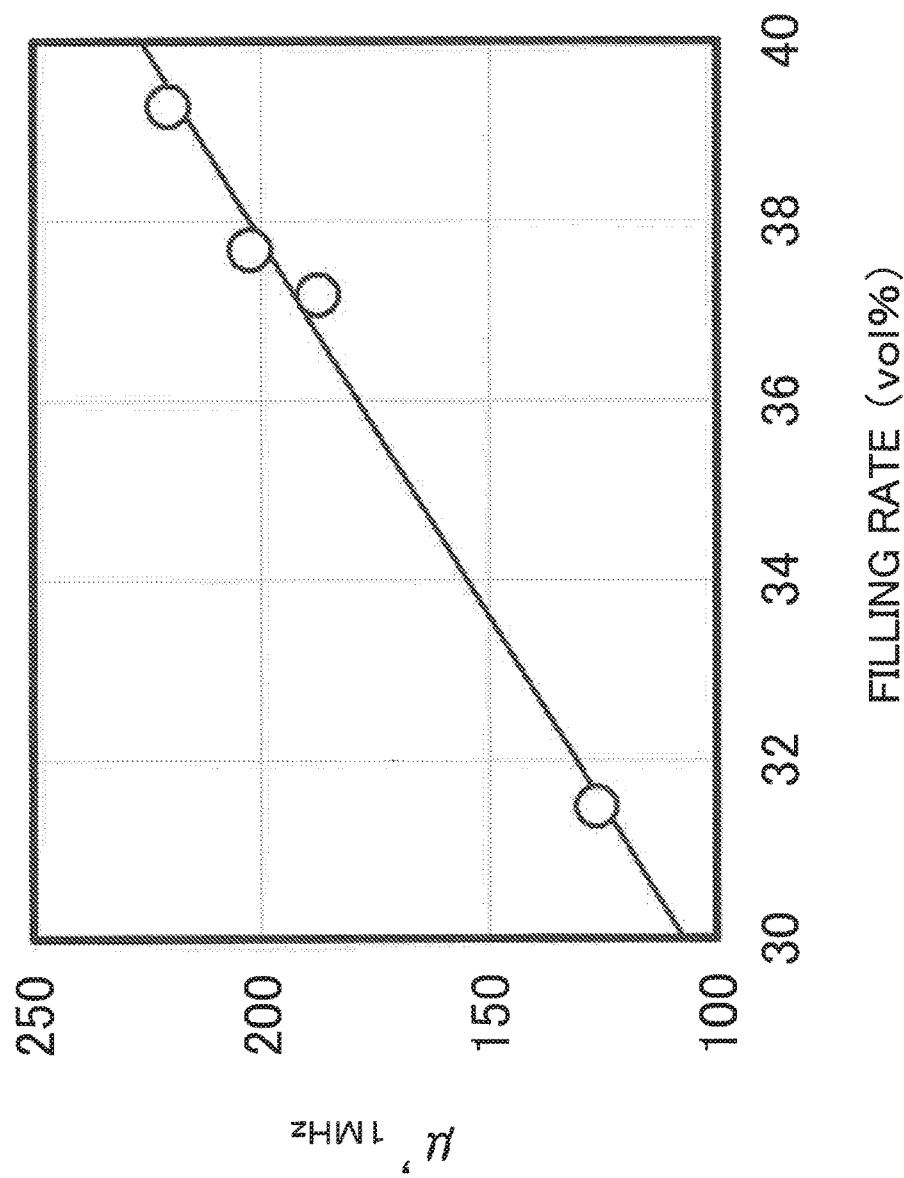
FIG. 2 is a graph showing a relation between a filling rate and $\mu'$ (23° C.) of a magnetic sheet.

FIG. 2 shows a relation between a filling rate and of a magnetic sheet. The larger the filling rate is, the higher μ' of the magnetic sheet is, and the filling rate is thus preferably larger. Roll press and hot press are known as a method for increasing a filling rate, but roll press has a problem with increase in Hc due to application of stress to the flat powder, and hot press needs to cut the sheet at the time of pressing and has a problem of incapability of having a roll product, although a filling rate can be increased without increase in Hc. Both of these methods have a problem with cost increase. In the present invention, μ' of about 220 can be obtained even with about 36 vol. % obtained without pressing.

What the present inventors noticed most is a temperature characteristic of μ' of a magnetic sheet. To increase μ' at room temperature, the present inventors have found out that a peak temperature of μ' needs to be 0° C. or more and 40° C. or less. The raw material powder has a moderate temperature characteristic, but has a large temperature characteristic when flattened.

Figure 3:
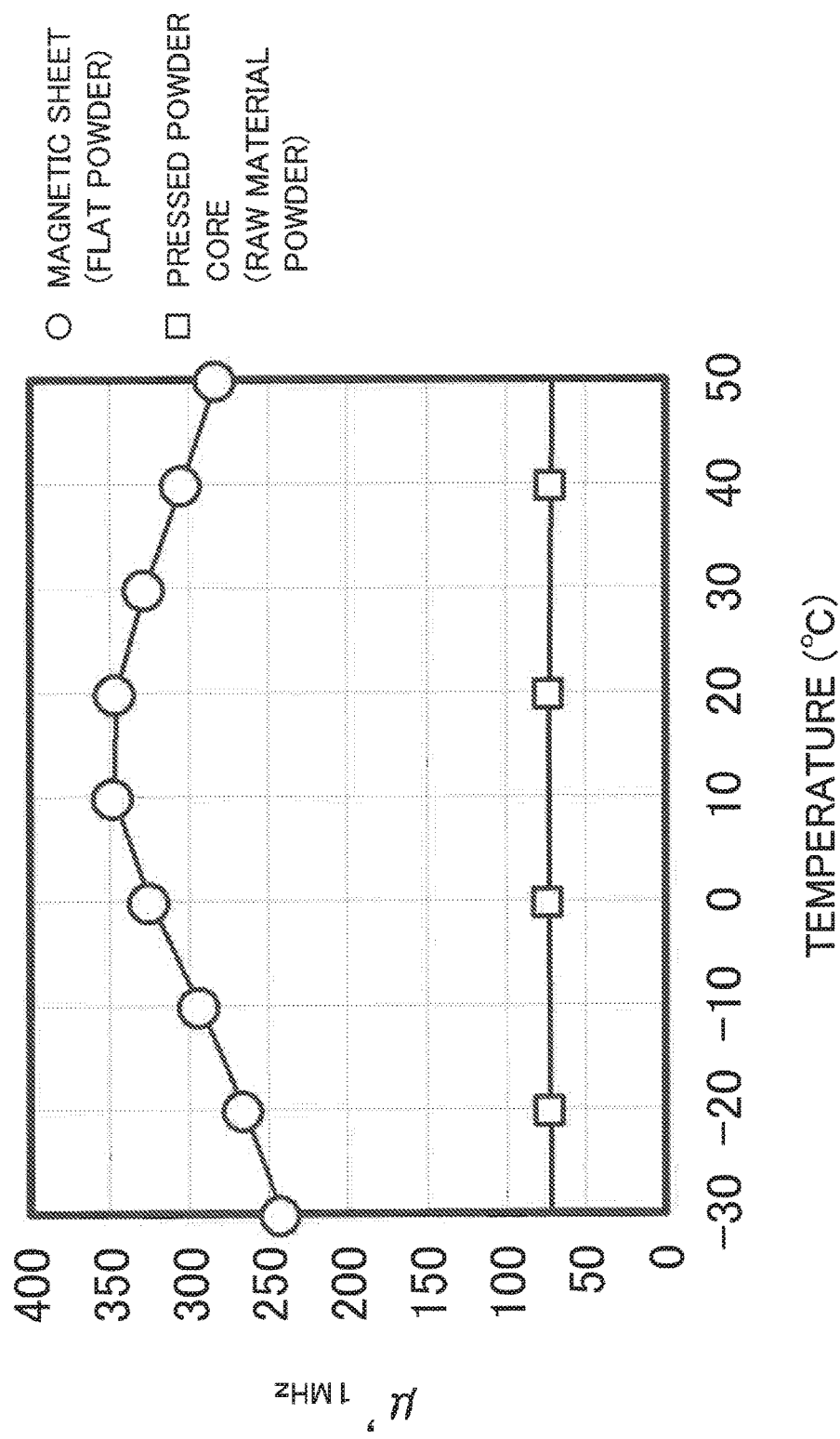
FIG. 3 is a graph showing temperature characteristics of $\mu'$ of a magnetic sheet using a flat powder and a pressed powder core using a raw material powder.

FIG. 3 shows temperature characteristics of μ' of a pressed powder core using a raw material powder and a magnetic sheet using a flat powder. The pressed powder core has an extremely small temperature change in μ', but the magnetic sheet has a large temperature change in μ'. In case of saturation magnetostriction constant $\lambda_s \approx 0$, μ' at room temperature is considered to be large, which can be achieved by controlling Si content and property of the flat powder.

Hereinafter, a preparation method for the flat soft magnetic material of the present embodiment will be described.

The above flat soft magnetic material can be prepared by carrying out a flattening treatment of a soft magnetic alloy powder.

The soft magnetic alloy powder is easily prepared by an atomizing method, such as a water atomizing method, a gas atomizing method, and a gas sprayed water atomizing method. In the present invention, a soft magnetic alloy powder prepared by a gas atomizing method is preferably used because a flat powder having a large $D_{50}$ and a small Hc is obtained easily. The raw material compositions are $9.3 \leq Si \leq 9.7$, $5.7 \leq Al \leq 6.1$, and remaining Fe. The compositions are analyzed by a method with a high accuracy. In the present example, Si is analyzed by a gravimetric method, and Al is analyzed by an ICP method.

The soft magnetic alloy powder is preferably subjected to a heat treatment in an inert atmosphere. When performing the heat treatment, crystal grain size increases, a flat powder having a large $D_{50}$ and a small Hc is obtained easily. When the heat treatment is performed in an inert atmosphere such as Ar atmosphere, oxidation and nitridization can be prevented. When the heat treatment has a low temperature, however, no crystal grain growth occurs or a longtime heat treatment is necessary. Meanwhile, when the heat treatment has a high temperature or is held for a long time, the soft magnetic alloy powder undergoes intensive aggregation or sintering, and the flattening treatment is thus difficult.

Next, the above heat treated powder is flattened by any method using an attritor, a ball mill, a vibration mill, or the like. In particular, an attritor is preferably used because the heat treated powder can be flattened for a short time, compared to a ball mill and a vibration mill. The flattening treatment is preferably carried out in a wet system using an organic solvent.

Even if a weak soft magnetic alloy powder is used, a sufficiently flattened powder whose grain size is large can be prepared with high yield by adding an organic solvent.

Examples of the above organic solvent include toluene, hexane, acetone, methanol, and monohydric alcohols having 2 to 4 carbon atoms.

The addition amount of the organic solvent is preferably 200 to 2000 parts by weight, more preferably 500 to 1000 parts by weight, with respect to 100 parts by weight of the heat treated powder. When the addition amount of the organic solvent is less than 200 parts by weight, the flat powder tends to have a small particle size. When the addition amount of the organic solvent is more than 2000 parts by weight, the treatment time becomes long, and productivity deteriorates.

To increase a particle size of the flat powder, a flattening aid may be used with the organic solvent. A fatty acid, such as stearic acid, may be preferably used as the flattening aid. The addition amount of flattening aid is preferably 0.1 to 5 parts by weight, more preferably 0.5 to 2 parts by weight, with respect to 100 parts by weight of the heat treated powder. Even when the addition amount of flattening aid exceeds 5 parts by weight, the particle size of the flat powder fails to become larger, recovery and reuse of the organic solvent is difficult, and a heat treatment furnace is contaminated severely. When a monohydric alcohol having 2 to 4 carbon atoms is used as the organic solvent, a flat powder with a large particle size can be obtained even without adding a flattening aid.

The flattening time is a time where an aspect ratio is 20 to 50. The larger the aspect ratio of the flat powder is, the smaller a bulk density (BD) is. Thus, a bulk density (BD) of the flat powder can be used as an alternative property of the aspect ratio. Experience teaches that a bulk density (BD) where an aspect ratio is 20 to 50 by sendust composition is 0.15 to 0.50 Mg/m$^3$. The bulk density (BD) can be measured using a bulk specific gravity meter by a method conforming to KS K-5101.

The 50% particle size $D_{50}$ and the aspect ratio of the flat powder are values measured by the following method. The $D_{50}$ is measured by a laser diffraction type grain size distribution measuring device utilizing Fraunhofer's diffraction theory and is a particle size when becoming 50% by integration of volume distribution. In the present example, the $D_{50}$ is a measured value using a product whose name is "HELOS & RODOS" with a dry dispersion unit manufactured by Sympatee Co., Ltd.

The aspect ratio is a value of "$D_{50}/t$", where "t" is an average value of thicknesses of the flat powder at 20 points whose cross section is observed after the flat powder is embedded with a resin, cured on a magnet having fluxes vertical to a polishing surface, and subjected to a or polishing.

After the flattening treatment, the obtained flat soft magnetic material is subjected to a heat treatment in an inert atmosphere, and the coercivity Hc is set to 60 A/m or less. The heat treatment temperature is preferably higher. When the heat treatment temperature exceeds 900° C., however, the obtained flat soft magnetic material is aggregated or sintered and is hard to turn into a sheet. The holding time is determined by a load weight, not by a load position, and is a time to reach a predetermined temperature. The coercivity Hc can be measured using a commercially available Hc meter (in the present example, product name "K-HC 1000" manufactured by Tohoku Special Steel Co., Ltd.).

<Magnetic Sheet>

The magnetic sheet is prepared using the above-mentioned flat sot magnetic material. The magnetic sheet of the present invention is prepared by the following method, for example.

A magnetic paint containing the flat soft magnetic material, a polyurethane resin as a binder, and a mixed solvent as a diluting solvent composed of a solvent selected from toluene, xylene, butyl acetate, or the like and a solvent such as methyl ethyl ketone is kneaded. This magnetic paint is kneaded by any method, and a planetary mixer is used in the present example. An isocyanate compound as a curing agent is added just before the end of the kneading, and this kneaded magnetic paint is finally defoamed in vacuum to remove bubbles contained in the paint.

A blending ratio of the binder is determined preferably in a range of 8 parts by weight or more and 22 parts by weight or less, more preferably in a range of 8 parts by weight or more and 18 parts by weight or less, with respect to 100 parts by weight of the flat soft magnetic material.

An addition amount of the curing agent is determined preferably in a range of 5 parts by weight or more and 30 parts by weight or less, more preferably in a range of 10 parts by weight or more and 20 parts by weight or less, with respect to 100 parts by weight of the binder.

An addition amount of the diluting solvent is determined so that the paint has a viscosity in a certain range. The paint preferably has a viscosity of 400 to 1500 mPa·s. When the paint has a viscosity of less than 400 mPa·s, traces of a magnetic orientation to be conducted immediately after application of the paint remain easily. When the paint has a viscosity of more than 1500 mPa·s, roughness easily remains on the surface of the sheet after being dried, and the sheet has a bad appearance.

The above-mentioned magnetic paint is applied onto a base film with a predetermined thickness by doctor blading and dried after a magnetic orientation. The base film is not limited, and a polyethylene terephthalate (PET) film whose thickness is 75 μm is used in the present example.

The sheet after the magnetic orientation is dried by any method, such as natural drying and a forcible drying by heating, but a natural drying is preferable for increase in filling rate.

The magnetic sheet after being dried is evaluated based on a filling rate and magnetic properties of the flat powder. The filling rate is calculated by the following manner. That is, the flat powder has a true density of 7M Mg/m$^3$, every six magnetic sheets are punched out into a toroidal shape in each lot using a die whose outer diameter is 18 mm and inner diameter is 10 mm, a density of each sheet is calculated from its weight and its thickness measured using a micrometer whose spindle diameter is 6 mm, and the filling rate is calculated by volume % in view of the mixture amount of the binder and the density.

Six samples having the above-mentioned toroidal shape are overlapped, and the magnetic properties are measured by one turn method using an impedance analyzer (manufactured by Agilent Technologies, product name "E4991A") and an attached test fixture (16454A).

A temperature characteristic of μ' is measured by the following manner. That is, 10 samples having the above-mentioned toroidal shape are overlapped, top and bottom thereof are protected by thick papers, the overlapped 10 samples are wound by a coated copper wire whose diameter is 0.2 mm by 20 turns and are arranged in a thermostatic tank, and the temperature characteristic of μ' is measured at 1 MHz using an impedance analyzer (YOKOGAW•HEWLETT•PACKARD company, product name "4192A LF IMPEDANCE ANALYZER"). This measured value is about 20% larger than a real value of the temperature characteristic of μ' due to the influence of floating capacity of the wire, and is thus for comparison by relative values.

A preferable embodiment of the present invention has been accordingly described, but the present invention is not limited to the embodiment.

EXAMPLES

Hereinafter, the present invention will be described specifically based on Examples, but is not limited thereto.

Examples 1 to 4 and Comparative Examples 1 and 2 through a magnetic field where the same poles oppose to each other for magnetic orientation, and a magnetic sheet layer is formed. The magnetic sheet layer is dried and subsequently peeled from the PET film, and a magnetic sheet obtained is evaluated with respect to filling rate and magnetic properties. The magnetic sheet has any thickness, but is adjusted to have a thickness of about 50 μm in the present example.

Figure 5:
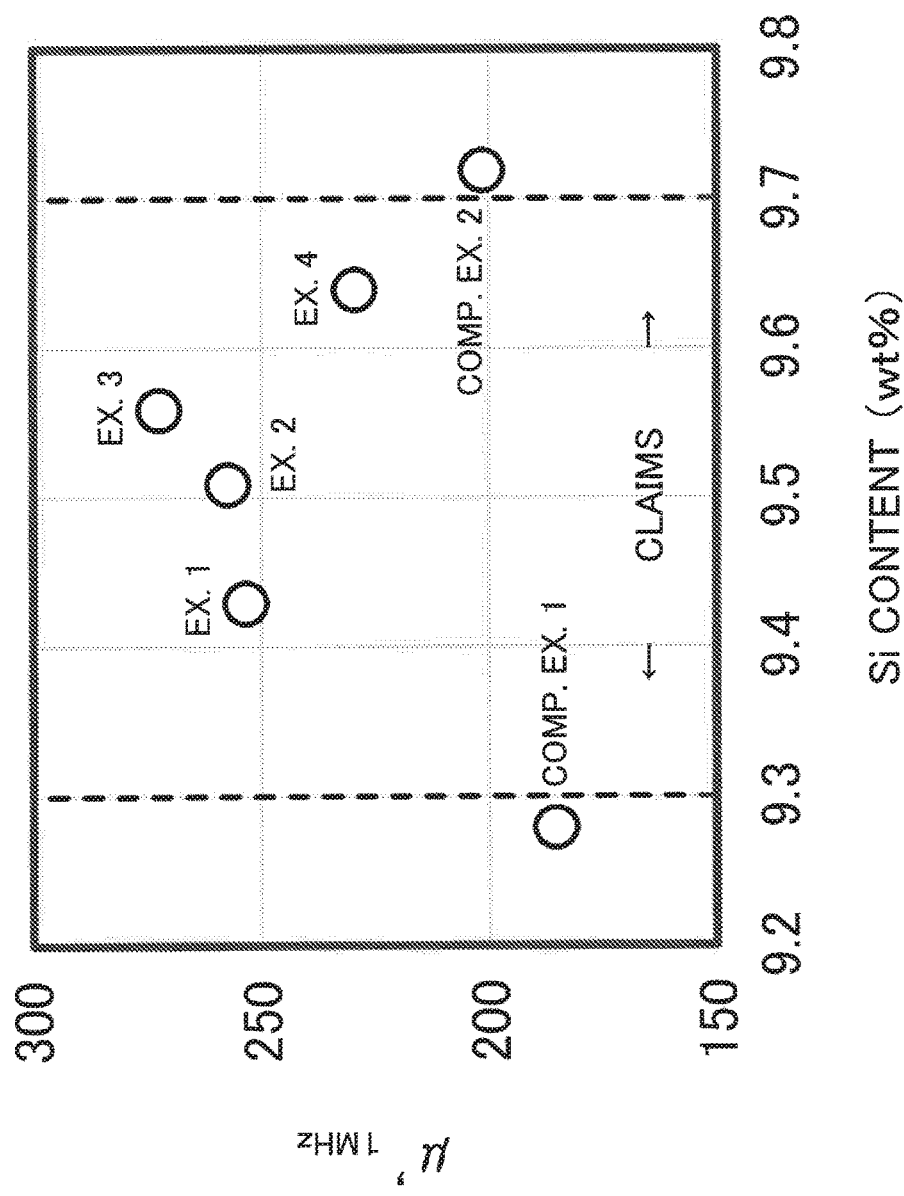
FIG. 5 is a graph showing relations between Si contents of Fe—Si—Al alloys and $\mu'$ (23° C.) of magnetic sheets.

FIG. 5 shows relations between. Si contents of raw materials and μ' (23° C.) of magnetic sheets of Examples 1 to 4 and Comparative Examples 1 and 2 shown in Table 1. Examples 1 to 4 obtain high values of μ' (23° C.) exceeding 220, but Comparative Examples 1 and 2 just obtain low values of μ' (23° C.) equal to or less than 220.

Figure 6:
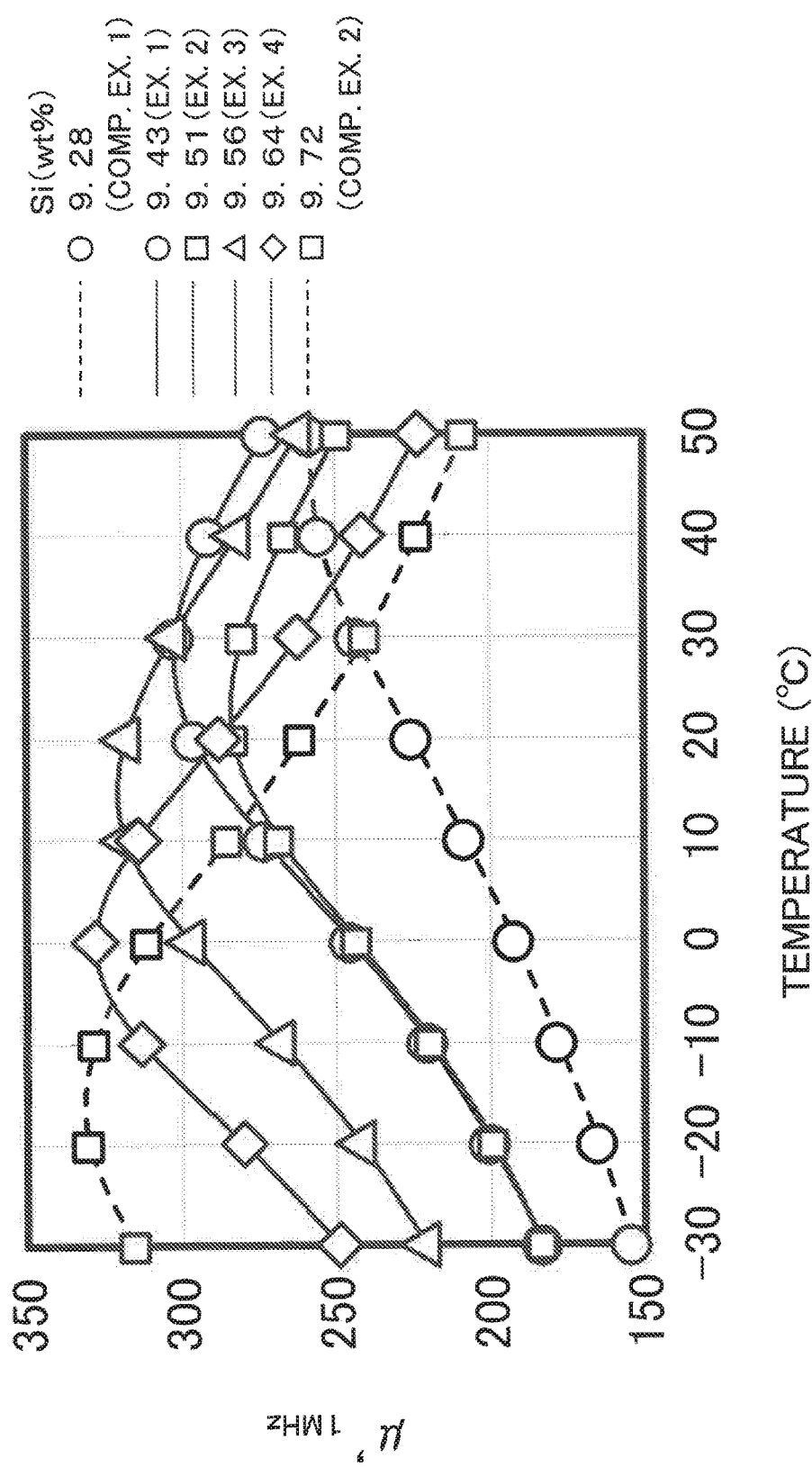
FIG. 6 is a graph showing temperature characteristics of $\mu'$ of Examples 1 to 4 and Comparative Examples 1 and 2.

FIG. 6 shows temperature characteristics of μ' of Examples 1 to 4 and Comparative Examples 1 and 2 shown in Table 1. It is found that peak temperatures of μ' are located

TABLE 1

| | Raw material compositions | | | Flattening | Flat powder properties | | | Sheet properties | | |
|---|---|---|---|---|---|---|---|---|---|---|
| | Si | Al | Fe | time | $D_{50}$ | Aspect | Hc | Filling rate | μ' | Peak temperature of μ' |
| | (wt %) | | | (h) | (μm) | ratio | (A/m) | (vol %) | (23° C.) | (° C.) |
| Comp. Ex. 1 | 9.28 | 5.94 | remaining | 8 | 79.0 | 31 | 58 | 36.6 | 185 | 50 |
| Ex. 1a | 9.40 | 5.85 | remaining | 8 | 78.2 | 30 | 53 | 38.5 | 235 | 38 |
| Ex. 1 | 9.43 | 6.05 | remaining | 8 | 77.5 | 30 | 51 | 38.2 | 253 | 28 |
| Ex. 2 | 9.51 | 5.85 | remaining | 8 | 76.7 | 27 | 55 | 39.6 | 257 | 23 |
| Ex. 3 | 9.56 | 5.84 | remaining | 8 | 71.5 | 25 | 40 | 41.1 | 272 | 15 |
| Ex. 4 | 9.64 | 5.85 | remaining | 8 | 73.4 | 26 | 48 | 38.9 | 229 | 0 |
| Ex. 4a | 9.65 | 5.92 | remaining | 8 | 72.0 | 25 | 47 | 38.0 | 225 | 0 |
| Comp. Ex. 2 | 9.72 | 5.72 | remaining | 8 | 77.4 | 27 | 44 | 38.2 | 201 | −16 |

Figure 4:
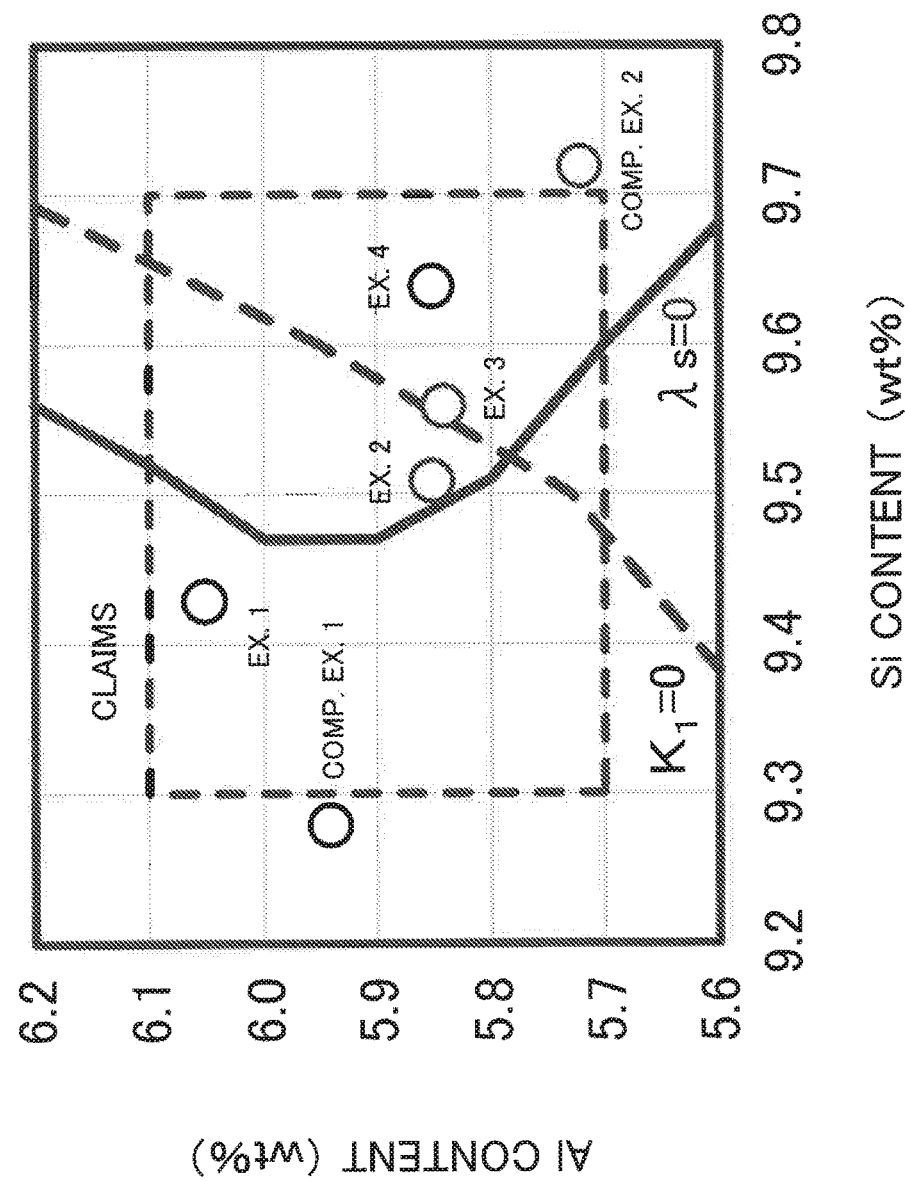
FIG. 4 is a graph showing raw material compositions of Examples 1 to 4 and Comparative Examples 1 and 2 and lines of CLAIMS, magnetocrystalline anisotropy constant $K_1=0$, and saturation magnetostriction constant $\lambda_s=0$.

FIG. 4 shows raw material compositions shown in Table 1 and lines of CLAIMS, magnetocrystalline anisotropy constant $K_1=0$, and saturation magnetostriction constant $\lambda_s=0$.

Fe—Si—Al alloys having the raw material compositions shown in Table 1 were prepared by a gas atomization method and treated for 2 hours at 1000° C. in an Ar atmosphere. Then, heat treated powders were obtained. A 5.7-fold amount of isopropyl alcohol (IPA) by weight was added to the heat treated powders, and a flattening treatment was conducted against the heat treated powders for 8 hours using an attritor. Then, flat powders were obtained. The flat powders were heat treated at 800° C. for 2 hours in an Ar atmosphere.

A slurry was prepared by mixing 100 parts by weight of the flat powder after the heat treatment, 14 parts by weight of a binder resin (polyurethane resin), 2 parts by weight of a curing agent (isocyanate compound), and 150 parts by weight of a diluting solvent (mixed solvent of toluene and MEK). The slurry is applied onto a PET film and passed around room temperature in the temperature characteristics of Examples 1 to 4, which have a large μ' (23° C.). Examples 1a and 4 also showed preferable behaviors of temperature characteristics similarly to Examples 1 to 4.

Figure 7:
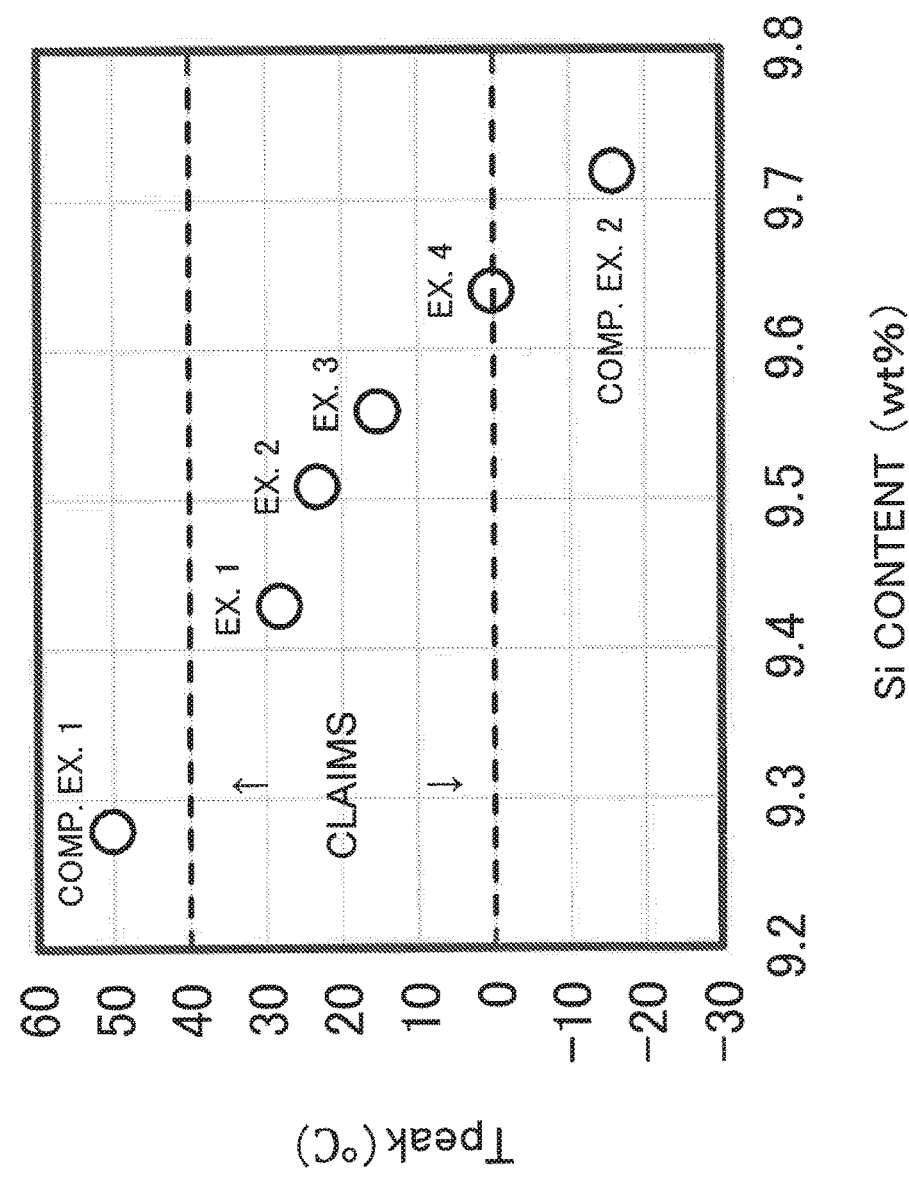
FIG. 7 is a graph showing relations between Si contents and peak temperatures of $\mu'$.

FIG. 7 shows relations between Si contents of raw materials and peak temperatures of μ'' of the magnetic sheets of Examples 1 to 4 and Comparative Examples 1 and 2 shown in Table 1. It is found that the peak temperatures of μt' change largely by slight change in the Si contents.

Examples 5 to 8 and Comparative Examples 3 to 7

As shown in Table 2, flat powders having different flattening time were prepared with the same raw material compositions as those of Examples 2 to 4. When the flat powder has a short flattening time, an aspect ratio is small, a peak temperature of μ' decreases, and the aspect ratio and the peak temperature may be out of CLAIMS.

TABLE 2

| | Raw material compositions | | | Flattening | Flat powder properties | | | Sheet properties | | |
|---|---|---|---|---|---|---|---|---|---|---|
| | Si | Al | Fe | time | $D_{50}$ | Aspect | Hc | Filling rate | μ' | Peak temperature of μ' |
| | (wt %) | | | (h) | (μm) | ratio | (A/m) | (vol %) | (23° C.) | (° C.) |
| Comp. Ex. 3 | 9.51 | 5.85 | remaining | 5 | 69.8 | 19 | 48 | 32.9 | 190 | 17 |
| Ex. 5 | | | | 6 | 70.4 | 21 | 48 | 36.1 | 222 | 18 |

TABLE 2-continued

| | Raw material compositions | | | Flattening time (h) | Flat powder properties | | | Sheet properties | | |
| --- | --- | --- | --- | --- | --- | --- | --- | --- | --- | --- |
| | Si | Al | Fe | | $D_{50}$ | Aspect | Hc | Filling rate | $\mu'$ | Peak temperature of $\mu'$ |
| | (wt %) | | | | ($\mu$m) | ratio | (A/m) | (vol %) | (23° C.) | (° C.) |
| Ex. 6 | | | | 7 | 74.2 | 25 | 53 | 39.8 | 253 | 21 |
| Ex. 2 | | | | 8 | 76.7 | 27 | 55 | 39.6 | 257 | 23 |
| Comp. Ex. 4 | 9.56 | 5.84 | remaining | 5 | 66.4 | 18 | 34 | 36.9 | 207 | 10 |
| Ex. 7 | | | | 6 | 68.6 | 21 | 35 | 39.6 | 242 | 11 |
| Ex. 8 | | | | 7 | 70.8 | 23 | 38 | 39.9 | 256 | 14 |
| Ex. 3 | | | | 8 | 71.5 | 25 | 40 | 41.1 | 272 | 15 |
| Comp. Ex. 5 | 9.64 | 5.85 | remaining | 5 | 67.8 | 19 | 42 | 35.2 | 179 | −6 |
| Comp. Ex. 6 | | | | 6 | 69.9 | 21 | 42 | 37.5 | 209 | −4 |
| Comp. Ex. 7 | | | | 7 | 70.5 | 24 | 46 | 38.5 | 220 | −3 |
| Ex. 4 | | | | 8 | 73.4 | 26 | 48 | 38.9 | 229 | 0 |

Figure 8:
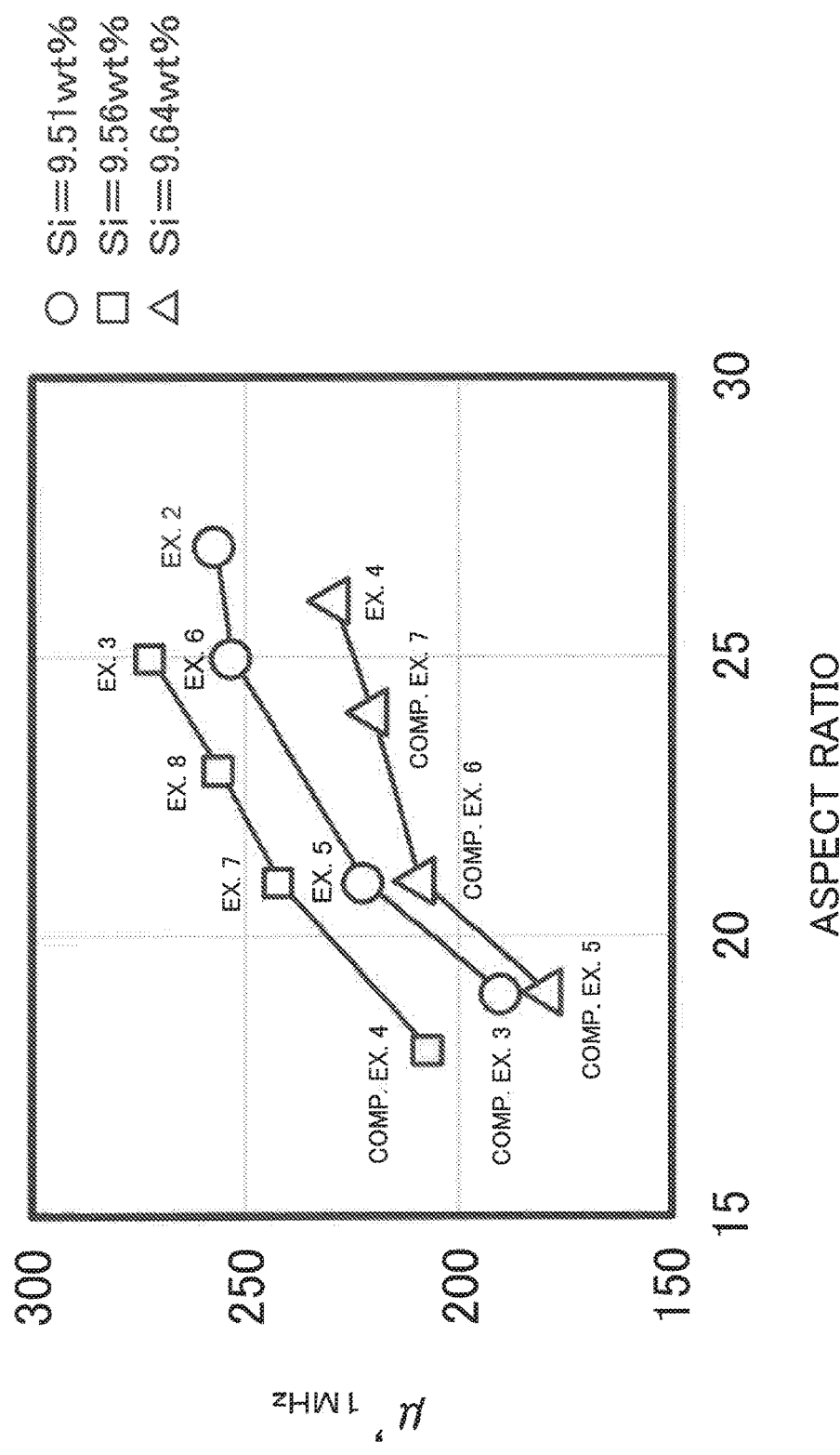
FIG. 8 is a graph showing relations between aspect ratios and μ' (23° C.) of Examples 2 to 8 and Comparative Examples 3 to 7.

FIG. 8 shows relations between aspect ratios of flat powders and $\mu'$ (23° C.) of Examples 2 to 8 and Comparative Examples 3 to 7 shown in Table 2. Examples 2 to 8, where the flat powders have an aspect ratio of 20 to 50, have high values of $\mu'$ (23° C.) exceeding 220, but Comparative Examples 3 to 5, where the flat powders have an aspect ratio of less than 20, just have low values of $\mu'$ (23° C.) equal to or less than 220. Comparative Examples 6 and 7, where the flat powders have an aspect ratio of 20 to 50 but the magnetic sheets have a peak temperature of $\mu'$ that is less than 0° C., also, just have low values of $\mu'$ (23° C.) equal to or less than 220.

Figure 9:
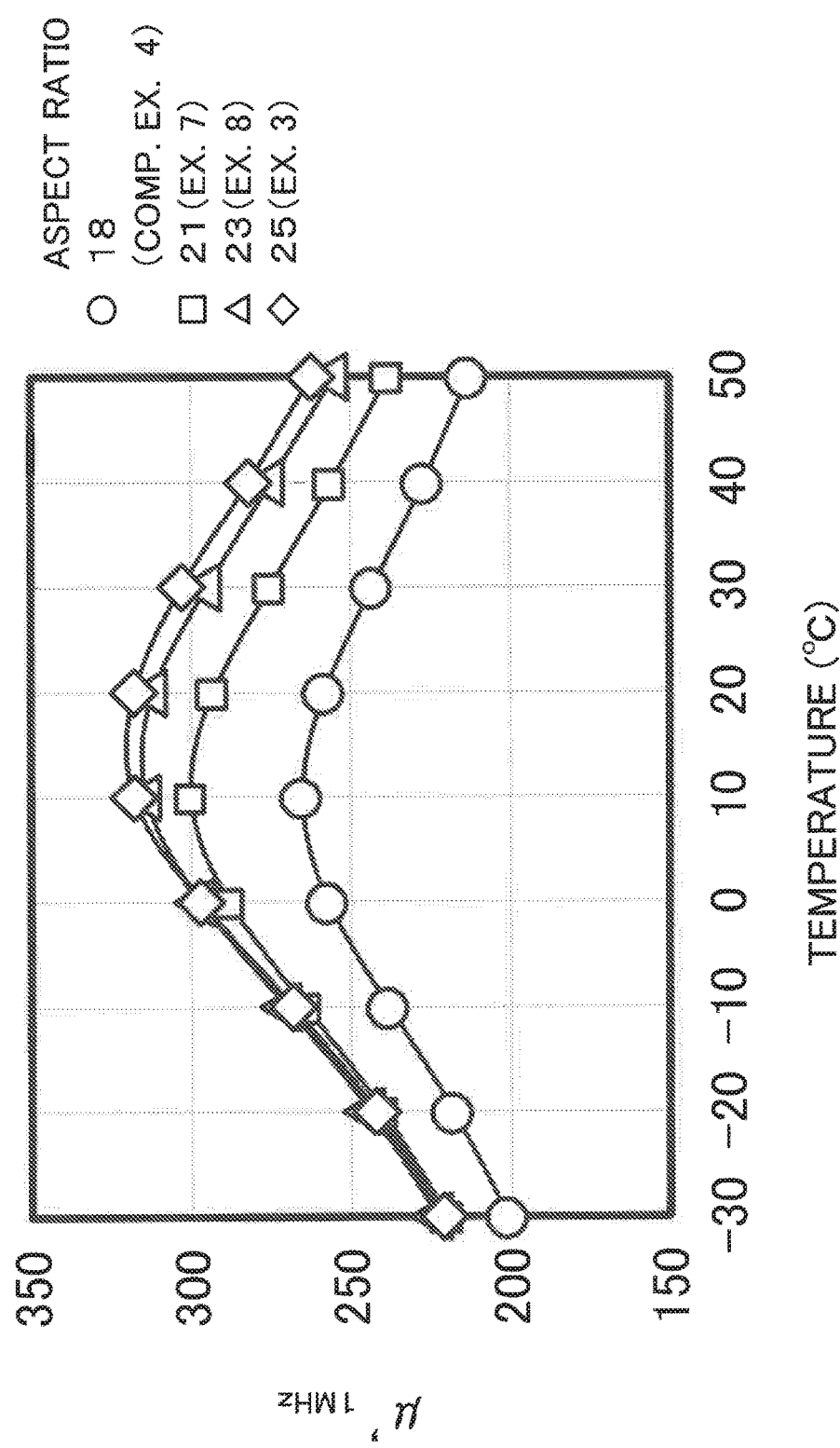
FIG. 9 is a graph showing temperature characteristics of μ' of Examples 3, 7, and 8 and Comparative Example 4.

FIG. 9 shows temperature characteristics of $\mu'$ of magnetic sheets using flat powders having different aspect ratios. The flat powders have aspect ratios becoming larger in the order of Comparative Example 4, Example 7, Example 8, and Example 3, but peak temperatures of $\mu'$ become higher in this order, and $\mu'$ on the side of high temperature is large.

Examples 9 and 10 and Comparative Examples 8 and 9 atmosphere. Then, heat treated powders were obtained. A 5.7-fold amount of isopropyl alcohol (IPA) by weight was added to the heat treated powders, and a flattening treatment was conducted against the heat treated powders for 8 hours using an attritor. Then, flat powders were obtained. The flat powders were heat treated at 800° C. for 2 hours in an Ar atmosphere.

A slurry was prepared by mixing 100 parts by weight of the flat powder after the heat treatment, 14 parts by weight of a binder resin (polyurethane resin), 2 parts by weight of a curing agent (isocyanate compound), and 150 parts by weight of a diluting solvent (mixed solvent of toluene and MEK). The slurry is applied onto a PET film and passed through a magnetic; field where the same poles oppose to each other for magnetic orientation, and a magnetic sheet layer is formed. The magnetic sheet layer is dried and subsequently peeled from the PET film, and a magnetic sheet obtained is evaluated with respect to filling rate and magnetic properties.

TABLE 3

| | Raw material compositions | | | Flattening time (h) | Flat powder properties | | | Sheet Properties | | |
| --- | --- | --- | --- | --- | --- | --- | --- | --- | --- | --- |
| | Si | Al | Fe | | $D_{50}$ | Aspect | Hc | Filling rate | $\mu'$ | Peak temperature of $\mu'$ |
| | (wt %) | | | | ($\mu$m) | ratio | (A/m) | (vol %) | (23° C.) | (° C.) |
| Comp. Ex. 8 | 9.49 | 5.61 | remaining | 8 | 75.9 | 27 | 63 | 38.4 | 195 | 41 |
| Ex. 9 | 9.54 | 5.73 | remaining | 8 | 74.8 | 28 | 59 | 39.0 | 229 | 25 |
| Ex. 2 | 9.51 | 5.85 | remaining | 8 | 76.7 | 27 | 55 | 39.6 | 257 | 23 |
| Ex. 10 | 9.49 | 5.96 | remaining | 8 | 74.2 | 26 | 54 | 40.2 | 248 | 21 |
| Ex. 1 | 9.43 | 6.05 | remaining | 8 | 77.5 | 30 | 51 | 38.2 | 253 | 28 |
| Comp. Ex. 9 | 9.49 | 6.18 | remaining | 8 | 73.5 | 26 | 61 | 39.5 | 200 | 29 |

Figure 10:
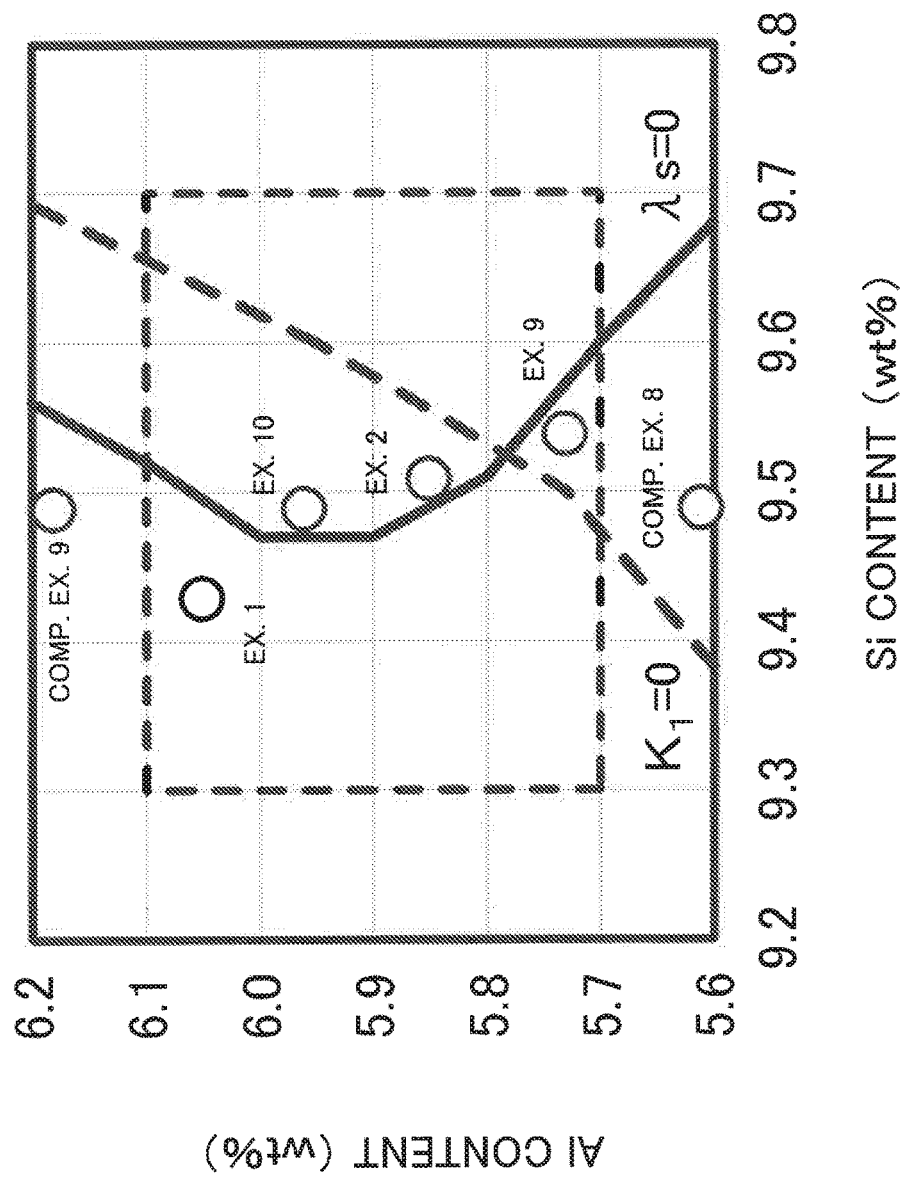
FIG. 10 is a graph showing raw material compositions of Examples 1, 2, 9, and 10 and Comparative Examples 8 and 9 and lines of CLAIMS, magnetocrystalline anisotropy constant $K_1=0$, and saturation magnetostriction constant $\lambda_s=0$.

FIG. 10 shows raw material compositions shown in Table 3 and lines of CLAIMS, magnetocrystalline anisotropy constant $K_1=0$, and saturation magnetostriction constant $\lambda_s=0$.

Figure 11:
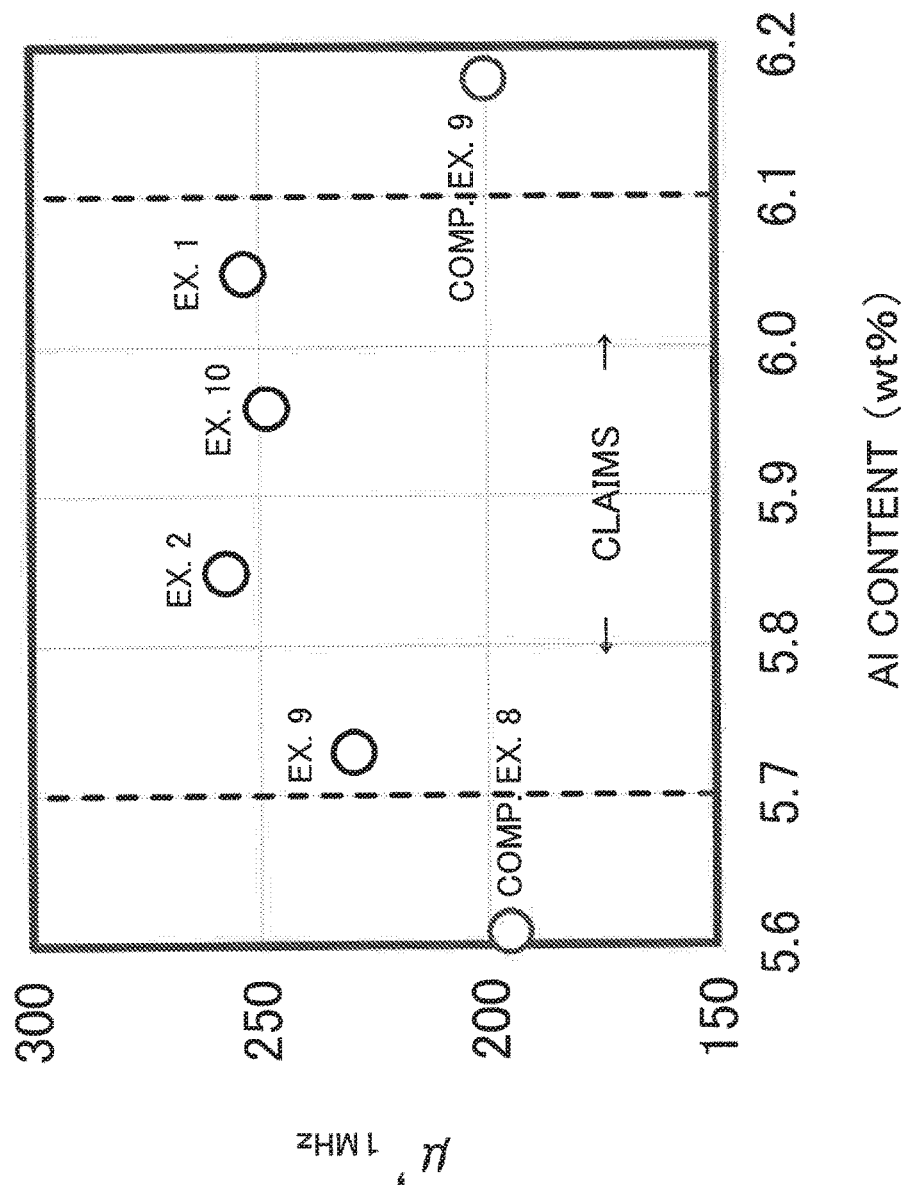
FIG. 11 is a graph showing relations between Al contents of Fe—Si—Al alloys and μ' (23° C.) of magnetic sheets.

Fe—Si—Al alloys having the raw material compositions shown in Table 3 were prepared by a gas atomization method and treated for 2 hours at 1000° C. in an Ar FIG. 11 shows relations between Al contents of raw materials and $\mu'$ (23° C.) of magnetic sheets shown in Table 3. Examples 9 and 10 satisfy compositions of CLAIMS and obtain high values of $\mu'$ (23° C.) exceeding 220, but Comparative Examples 8 and 9 are out of compositions of CLAIMS and thus just obtain low values of $\mu'$ (23° C.) equal to or less than 220.

Examples 11 and 12 and Comparative Examples 10 to 12

TABLE 4

| | Raw material compositions | | | Flattening | Flat Powder properties | | | Sheet properties | | |
|---|---|---|---|---|---|---|---|---|---|---|
| | | | | | | | | Filling rate | | Peak temperature |
| | Si | Al | Fe | time | $D_{50}$ | Aspect | Hc | rate | µ' | of µ' |
| | (wt %) | | | (h) | (µm) | ratio | (A/m) | (vol %) | (23° C.) | (° C.) |
| Comp. Ex. 10 | 9.56 | 5.84 | remaining | 8 | 29.9 | 33 | 95 | 44.2 | 165 | 22 |
| Comp. Ex. 11 | | | | | 38.6 | 29 | 72 | 43.6 | 179 | 19 |
| Ex. 11 | | | | | 58.0 | 26 | 56 | 42.0 | 237 | 17 |
| Ex. 4 | | | | | 71.5 | 25 | 40 | 41.1 | 272 | 15 |
| Ex. 12 | | | | | 85.0 | 23 | 38 | 39.0 | 275 | 13 |
| Comp. Ex. 12 | | | | | 105.3 | 22 | 35 | 34.7 | 208 | 10 |

Figure 12:
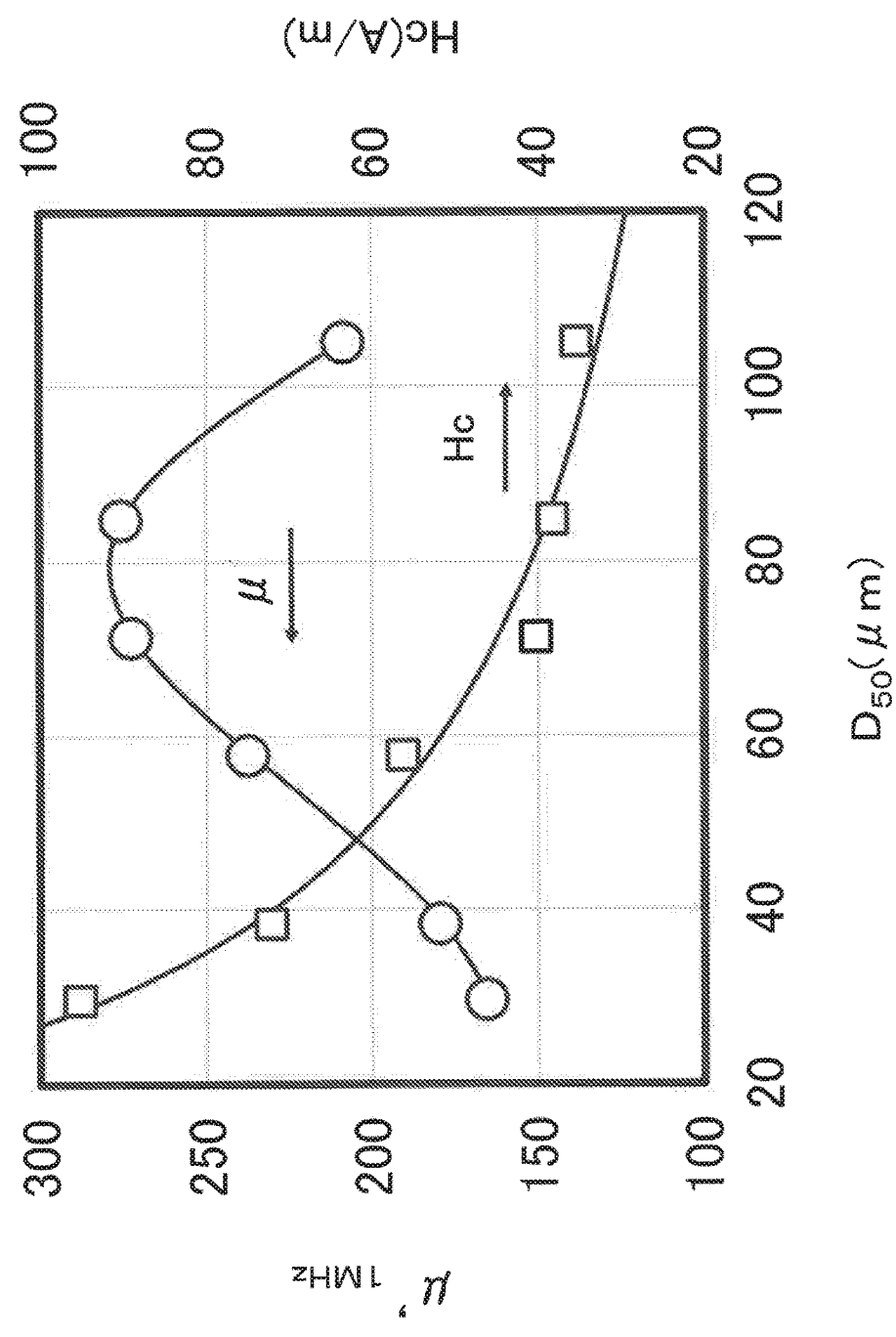
FIG. 12 is a graph showing a relation among $D_{50}$ of a flat powder, Hc of the flat powder, and μ' if of a magnetic sheet.

Table 4 shows evaluation results of a sieved and classified flat powder of Example 4. FIG. 12 shows a relation among $D_{50}$ of the flat powder, Hc of the flat powder, and µ' of a sheet. When the flat powder has a small particle size, Hc becomes large, and µ' of the sheet thus decreases. To have µ' of the sheet equal to or more than 220, the flat powder needs to have a particle size of 50 µm or more. On the other hand, when the flat powder has a large particle size, Hc becomes small, but the sheet has a rough surface, an apparent filling rate decreases, and µ' of the sheet thus decreases. To have µ' of the sheet equal to or more than 220, the flat powder needs to have a particle size of 100 µm or less.

The invention claimed is:

1. A magnetic sheet comprising, by vol. %, Fe—Si—Al alloy flat powder: 36% or more, the Fe—Si—Al alloy flat powder (i) comprising, by wt %, 9.40≤Si≤9.65, 5.7%≤Al≤6.1%, and remaining Fe, and (ii) having:
   an aspect ratio in a range of 20 or more and 50 or less;
   a 50% particle size $D_{50}$ in a range of 50 µm or more and 100 µm or less; and
   a coercivity Hc of 60 A/m or less,
   wherein the magnetic sheet has a temperature characteristic of permeability µ' measured at 1 MHz exhibiting a maximum value in a range of 0° C. or more and 40° C. or less.

* * * * *